US010383280B2

(12) United States Patent
Krause et al.

(10) Patent No.: US 10,383,280 B2
(45) Date of Patent: Aug. 20, 2019

(54) MOWER DECK DISCHARGE CHUTE WITH DRIVE BELT TUNNEL

(71) Applicant: Deere & Company, Moline, IL (US)

(72) Inventors: Meghan M. Krause, Horicon, WI (US); Ryan J. Glover, Campbellsport, WI (US); Kyle T. Ressler, West Bend, WI (US); Juan Quintanilla, Monterrey (MX); Bruno Jacobo, Apodaca (MX); Trevor Huss, Beaver Dam, WI (US)

(73) Assignee: Deer & Company, Moline, IL (US)

( * ) Notice: Subject to any disclaimer, the term of this patent is extended or adjusted under 35 U.S.C. 154(b) by 0 days.

(21) Appl. No.: 15/700,431

(22) Filed: Sep. 11, 2017

(65) Prior Publication Data

US 2019/0075728 A1    Mar. 14, 2019

(51) Int. Cl.
  A01D 43/077    (2006.01)
  A01D 34/00     (2006.01)
  A01D 42/00     (2006.01)
  A01D 34/71     (2006.01)
  A01D 34/63     (2006.01)
  A01D 101/00    (2006.01)

(52) U.S. Cl.
  CPC ......... *A01D 43/077* (2013.01); *A01D 34/005* (2013.01); *A01D 34/71* (2013.01); *A01D 42/005* (2013.01); *A01D 34/63* (2013.01); *A01D 2101/00* (2013.01)

(58) Field of Classification Search
  CPC .... A01D 43/077; A01D 34/71; A01D 42/005; A01D 34/005
  USPC ................................................. 56/13.3, 13.4
  See application file for complete search history.

(56) References Cited

U.S. PATENT DOCUMENTS

| 4,114,353 | A | 9/1978 | Ansbaugh et al. |
| 4,614,080 | A | 9/1986 | Hoepfner et al. |
| 4,693,063 | A | 9/1987 | Hoepfner et al. |
| 4,711,073 | A | 12/1987 | Freier, Jr. et al. |
| 4,735,037 | A | 4/1988 | Benter |
| 4,936,885 | A | 6/1990 | Samejima et al. |
| 4,945,716 | A | 8/1990 | Murakawa et al. |
| 4,996,829 | A | 3/1991 | Salton et al. |
| 5,018,344 | A | 5/1991 | Samejima et al. |
| 5,224,327 | A | 7/1993 | Minoura et al. |
| 5,240,461 | A | 8/1993 | Hohnl |
| 5,669,211 | A | 9/1997 | Bening et al. |
| 5,669,212 | A | 9/1997 | Bening et al. |
| 7,313,902 | B1 | 1/2008 | Eavenson, Sr. et al. |
| 8,544,248 | B2 * | 10/2013 | McKay ............ A01D 34/69 56/16.9 |
| 9,032,701 | B2 | 5/2015 | Walker |
| 2009/0301050 | A1 | 12/2009 | Kohler |
| 2017/0202140 | A1 | 7/2017 | Lopez et al. |

OTHER PUBLICATIONS

European Search Report issued in counterpart application No. 18193089.2 dated Jan. 18, 2019. (7 pages).

* cited by examiner

*Primary Examiner* — Alicia Torres

(57) ABSTRACT

A mower deck discharge chute includes a flexible member attached with a hinge to a multi-blade mower deck, and a drive belt tunnel through the flexible member that an attachment drive belt passes through when the flexible member is pivoted up to a generally vertical position. The attachment drive belt may be on a single plane to engage a drive sheave on the multi-blade mower deck, a driven sheave on the belt driven attachment, and an idler.

15 Claims, 3 Drawing Sheets

MOWER DECK DISCHARGE CHUTE WITH DRIVE BELT TUNNEL

FIELD OF THE INVENTION

This invention relates generally to rotary mower decks carried by tractors or other grass mowing machines. More specifically, the invention relates to a mower deck side discharge chute on a multi-blade rotary mower deck having belt driven attachments.

BACKGROUND OF THE INVENTION

Tractors, utility vehicles or zero turn mowers used for lawn care may carry a mower deck covering two or more rotary cutting blades on the lower ends of vertically oriented spindles. The blade spindles may be rotated by one or more belts and pulleys above the top surface of the deck, which may be driven by a belt and/or power take off shaft connected to the engine or other power source.

Multi-blade mower decks typically include side discharge openings in the side of the deck for grass clippings cut by the blades to exit from the deck where they are deposited onto the ground. A side discharge chute, also called a deflector or guard, may be mounted to extend laterally outwardly and downwardly over the side discharge opening. The chute may be flexible, such as a rubber or plastic material, and may direct clippings downwardly into the turf alongside the mower deck.

Belt driven attachments such as material collection systems having fans are commonly attached to multi-blade mower decks, to help grass clippings flow from a side discharge opening upwardly and rearwardly through a material collection chute into one or more containers or hoppers. In the past, drive belts for belt driven attachments have been routed around mower deck discharge chutes, requiring twisting of the attachment drive belt to operate in two or more planes. This has shortened the life of belt drive systems, made it more difficult to install belt driven attachments, and increased overall system cost. An alternative is needed that has increased life, is easier to install, and has lower cost.

SUMMARY OF THE INVENTION

A mower deck discharge chute includes a drive belt tunnel extending through an end portion of flexible member mounted above a side discharge opening of a multi-blade mower deck. The mower deck discharge chute may be pivoted to a lowered position in which the drive belt tunnel rests against a horizontal top surface of the multi-blade mower deck, and a raised position in which an attachment drive belt on a generally horizontal plane passes through the drive belt tunnel between the multi-blade mower deck and a belt driven attachment. The mower deck discharge chute increases the life of belt drive systems, makes it easier to install belt driven attachments, and reduces overall system cost.

DESCRIPTION OF THE PREFERRED EMBODIMENT

Figure 1:
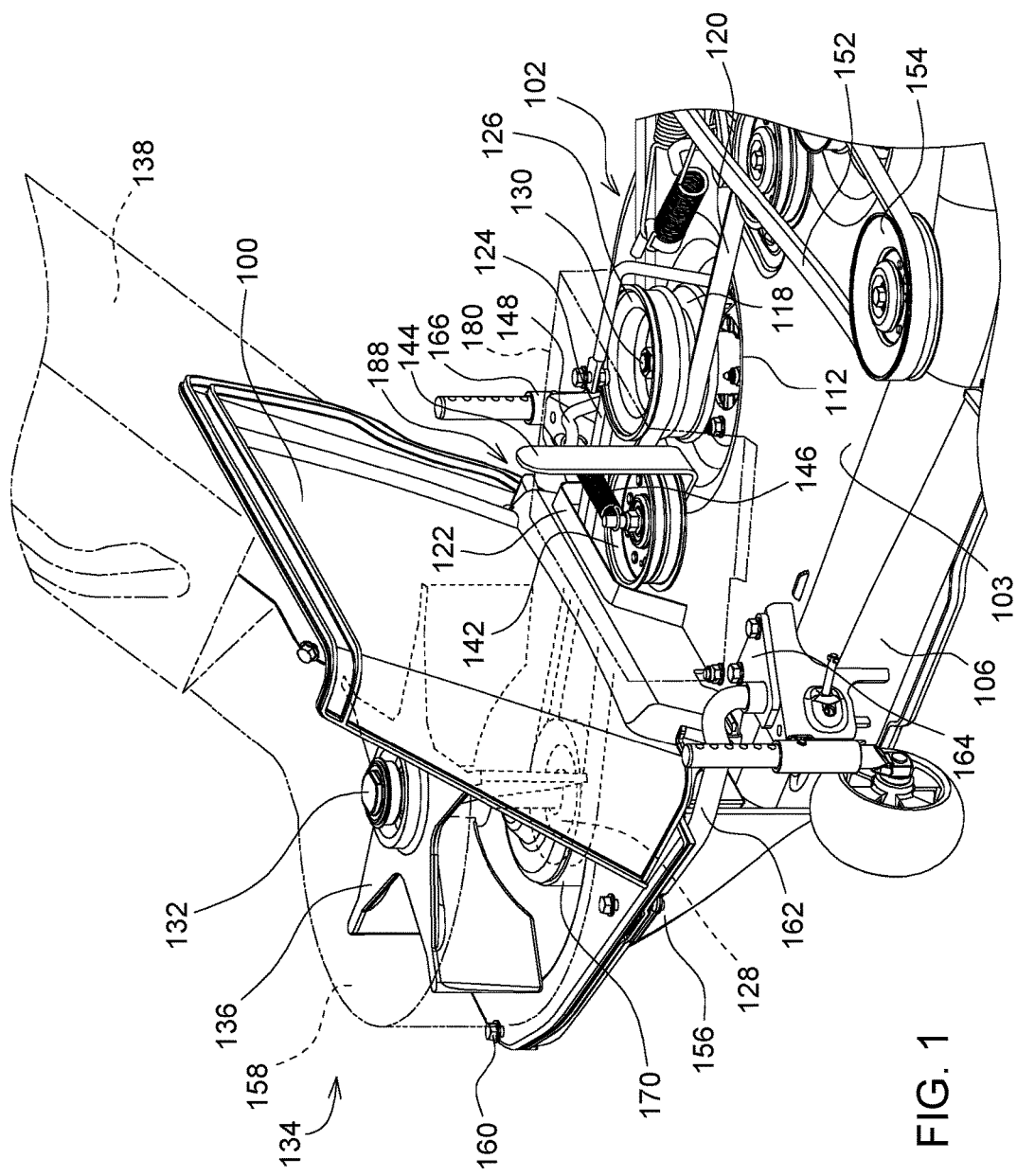
FIG. 1 is a top perspective view of a mower deck discharge chute with a drive belt tunnel on a multi-blade mower deck according to a first embodiment of the invention.
Figure 2:
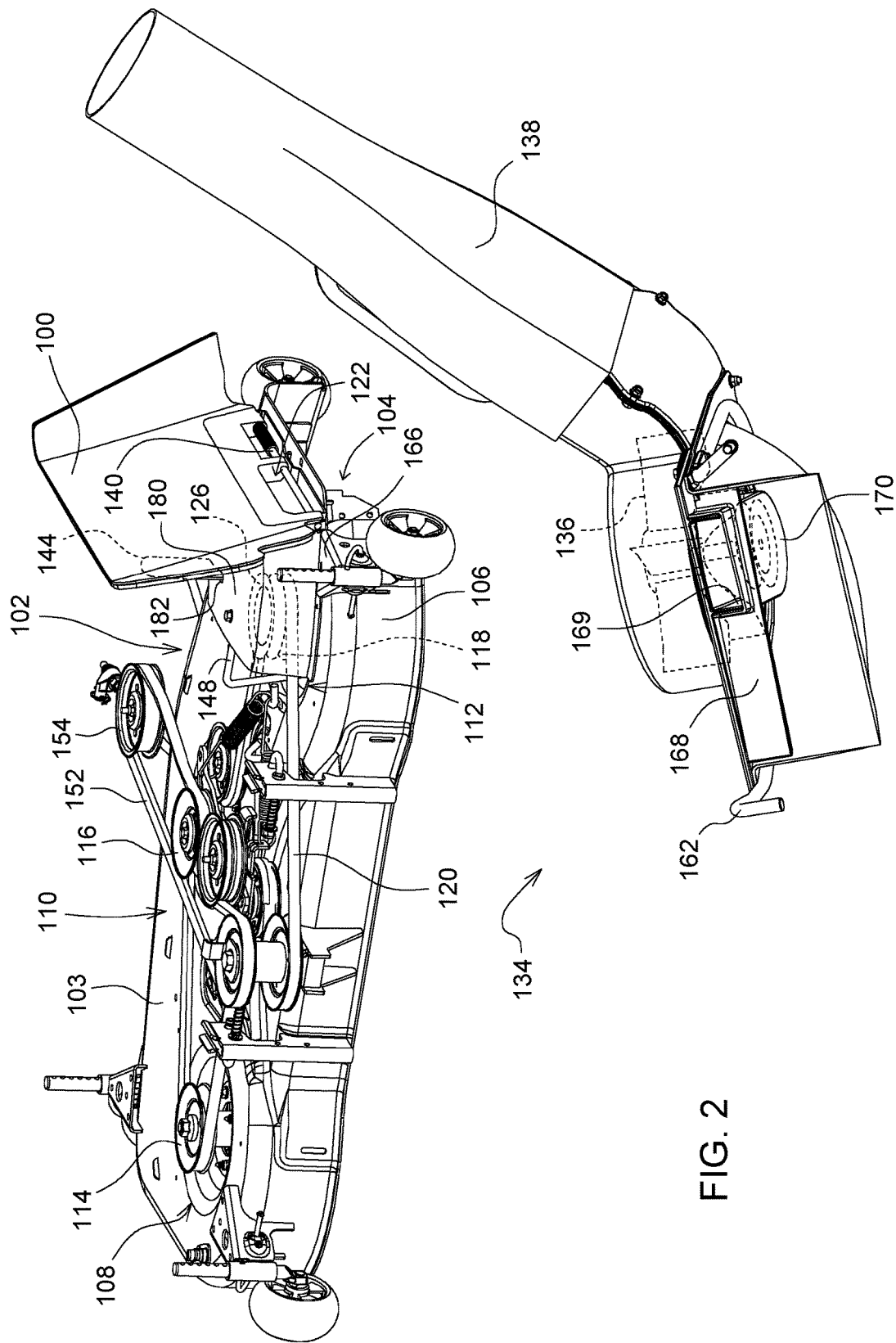
FIG. 2 is a top perspective view of a multi-blade mower deck having a mower deck discharge chute with a drive belt tunnel, and a material collection system removed from the mower deck, according to a first embodiment of the invention.
Figure 3:
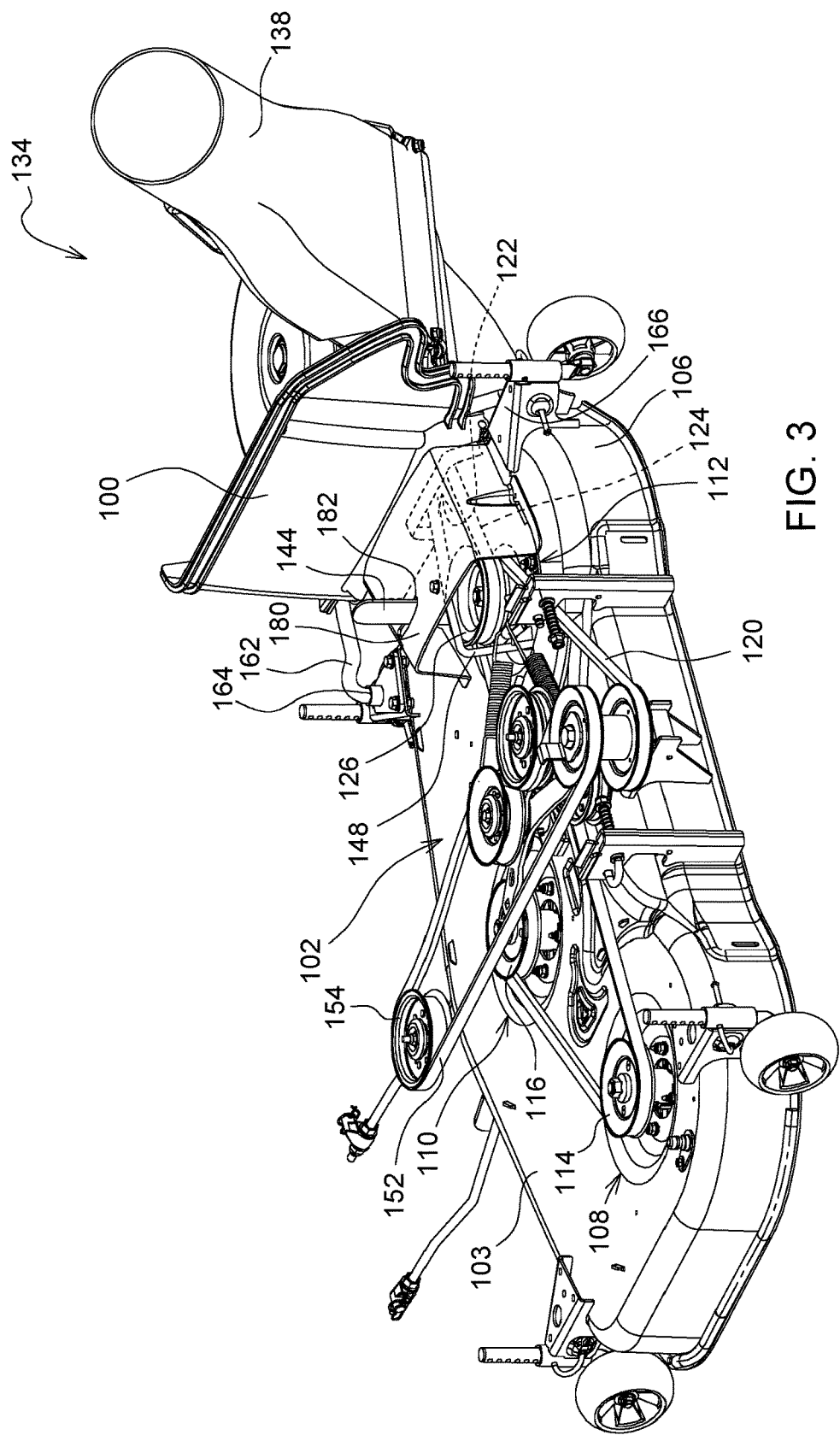
FIG. 3 is a top perspective view of a multi-blade mower deck having a mower deck discharge chute with a drive belt tunnel, and a material collection system installed on the mower deck, according to a first embodiment of the invention.

As shown in FIGS. 1-3, in one embodiment, mower deck discharge chute 100 may be pivotably mounted to multi-blade mower deck 102, directly above side discharge opening 104. The side discharge opening may be through a downwardly depending skirt 106 of the multi-blade mower deck. The multi-blade mower deck may have a generally horizontal top surface 103, a plurality of generally circular cutting chambers 108, 110, 112, and a rotary cutting blade in each cutting chamber attached to a vertically oriented blade spindle. Primary deck drive belt 152 may pull power from drive sheave 154 attached to the engine drive shaft, and secondary deck drive belt 120 may transmit power to sheaves 114, 116, 118 on the blade spindles. The multi-blade mower deck may be positioned under a tractor, utility vehicle or zero turn mower, preferably between the front and rear wheels.

In one embodiment, mower deck discharge chute 100 may extend laterally outwardly and downwardly over side discharge opening 104. The mower deck side discharge chute may be a flexible member, such as rubber or plastic. The mower deck side discharge chute may include drive belt tunnel 122 through an end portion of the flexible member where hinge 140 may be located. Attachment drive belt 124 may pass through the drive belt tunnel between multi-blade mower deck 102 and belt driven attachment 134. The drive belt tunnel may be a permanent or semi-permanent, perforated feature in the flexible member, or may be cut out from a pattern provided directly on the discharge chute or on a label attached to the discharge chute. The mower deck discharge chute may be mounted to the mower deck with spring biased hinge 140 attached to the top surface of the multi-blade mower deck adjacent and above side discharge opening 104, which may include a wire form hinge pin. The wire form may be uniaxial, or may be bent around the drive belt tunnel. The mower deck discharge chute may be spring biased to pivot down to a lowered position for side discharge of grass clippings. In the lowered position, the end portion of the side discharge chute and drive belt tunnel may rest against or be in close proximity to the horizontal top surface of the mower deck above the side discharge opening. When the mower deck discharge chute is pivoted up to the raised position and the belt driven attachment is installed, the mower deck discharge chute may be substantially vertically aligned so that the drive belt tunnel may be used to enable the attachment drive belt to pass on a single generally horizontal plane between the multi-blade mower deck and belt driven attachment above the side discharge opening.

In one embodiment, mower deck discharge chute 100 with drive belt tunnel 122 may be used with belt driven attachment 134 operated using simple drive 188 consisting of attachment drive belt 124, drive sheave 126, driven sheave 128, and idler or belt tensioning pulley 142. Drive belt tunnel 122 may provide an opening through the mower deck discharge chute for the attachment drive belt. As a result, the simple drive may operate in one generally horizontal plane, without twisting of the attachment drive belt between two or more planes. Additionally, the attachment drive belt may engage only the drive sheave, driven sheave and idler. As a result, the mower deck discharge chute with a drive belt tunnel may help lengthen the life of the attachment drive belt and other components of the simple drive, increase the ease of attachment or installation of a belt driven attachment to a multi-blade mower deck, and reduce system cost.

In one embodiment, mower deck discharge chute 100 with drive belt tunnel 122 may be used with simple drive 188 having idler 142 rotatably mounted on idler arm 144. Idler spring 146 may be connected between the idler arm and wire form 148 to bias the idler into engagement with the attachment drive belt. Drive sheave 126 may be mounted on spindle 130 above sheave 118 on the mower deck. Driven sheave 128 may be mounted on spindle 132 on belt driven attachment 134. An operator may move the idler out of engagement with the attachment drive belt, and disengage the attachment drive belt from the drive sheave and/or driven sheave, by pivoting one end of the idler arm, which may extend through slot 182 in shield 180. The shield may be attached to and supported by wire form 148 on the top surface of the multi-blade mower deck, and may cover drive sheave 126 and idler 142.

In one embodiment, mower deck discharge chute 100 with drive belt tunnel 122 may be used with belt driven attachment 134 such as material collection system having belt driven fan or impeller 136. The belt driven fan may rotate to help grass clippings flow from side discharge opening 104 upwardly and rearwardly through material collection chute 138 into one or more containers or hoppers. The belt driven fan may be rotatably mounted on vertically oriented spindle 132 above driven sheave 128. The material collection system may have lower housing 156 and upper housing 158. The lower housing and upper housing may be secured together with fasteners 160, and the lower housing may be pivotably attached to the mower deck with wire form 162. The wire form may extend around the perimeter of the lower housing and the ends of the wire form may engage holes in gage wheel supports 164, 166 adjacent the front and rear of the side discharge opening. The lower housing may pivot relative to the multi-blade mower deck if only one end of the wire form is engaged to the mower deck. The lower housing may include wall 168 facing the mower deck and extending above the side discharge opening. Additionally, the lower housing may include opening or passage 169 through or adjacent the wall and in the same horizontal plane as drive belt tunnel 122, where the attachment drive belt may enter the lower housing. Optionally, belt cover 170 also may extend generally horizontally into the lower housing above the side discharge opening. The belt cover may enclose driven sheave 128 and the portion of attachment drive belt 124 extending into and within the lower housing, helping grass clippings flow around the driven sheave and the attachment drive belt.

Having described the preferred embodiment, it will become apparent that various modifications can be made without departing from the scope of the invention as defined in the accompanying claims.

The invention claimed is:

1. A mower deck discharge chute, comprising:
a flexible member having a drive belt tunnel extending through an end portion thereof and being mounted above a side discharge opening in a downwardly depending skirt of a multi-blade mower deck with a spring biased hinge;
the mower deck discharge chute being pivotable to a lowered position extending laterally outwardly over the side discharge opening in which the drive belt tunnel rests against a horizontal top surface of the multi-blade mower deck, and to a raised position in which an attachment drive belt above the side discharge opening passes through the drive belt tunnel between the multi-blade mower deck and a belt driven attachment.

2. The mower deck discharge chute of claim 1 wherein the attachment drive belt is generally horizontally aligned in a single plane above the side discharge opening.

3. The mower deck discharge chute of claim 1 wherein the belt driven attachment includes a driven sheave of a fan of a material collection system.

4. The mower deck discharge chute of claim 1 further comprising an idler spring tensioning the attachment drive belt.

5. The mower deck discharge chute of claim 1 further comprising a belt cover enclosing a portion of the attachment drive belt within the belt driven attachment.

6. A mower deck discharge chute, comprising:
a flexible member attached to a multi-blade mower deck and pivotable between a lowered position for side discharge of grass clippings and a raised position for installation of a belt driven attachment to the multi-blade mower deck; and
an attachment drive belt extending on a single plane through a drive belt tunnel in the flexible member when the flexible member is in the raised position, and engaging only a drive sheave on the multi-blade mower deck, a driven sheave on the belt driven attachment, and an idler.

7. The mower deck discharge chute of claim 6 wherein the belt driven attachment is a material collection system with a fan.

8. The mower deck discharge chute of claim 6 further comprising an idler arm that is spring biased to move the idler into engagement with the attachment drive belt.

9. The mower deck discharge chute of claim 6 further comprising a wall on the belt driven attachment above the side discharge opening.

10. The mower deck discharge chute of claim 9 further comprising an opening in the same plane as the drive belt tunnel.

11. A mower deck discharge chute, comprising:
a pivoting flexible member extending outwardly over a side discharge opening through a downwardly depending skirt of a multi-blade mower deck;
the pivoting flexible member having a drive belt tunnel that an attachment drive belt extends through when the pivoting flexible member is pivoted up to a generally vertical position;
the drive belt tunnel horizontally aligned with an opening in a wall of a belt driven attachment to the multi-blade mower deck.

12. The mower deck discharge chute of claim 11 wherein the attachment belt is in a single generally horizontal plane.

13. The mower deck discharge chute of claim 11 wherein the belt driven attachment is a material collection system with a fan.

14. The mower deck discharge chute of claim 11 wherein the attachment belt is engaged to a drive sheave on the multi-blade mower deck, a driven sheave on the belt driven attachment, and an idler mounted to a spring biased idler arm.

15. The mower deck discharge chute of claim 11 wherein the drive belt tunnel is removable as a perforated feature in the flexible member.

* * * * *